May 19, 1942.  R. G. AURIEN  2,283,864
BRAKE ARRANGEMENT
Filed Sept. 20, 1940   2 Sheets-Sheet 1
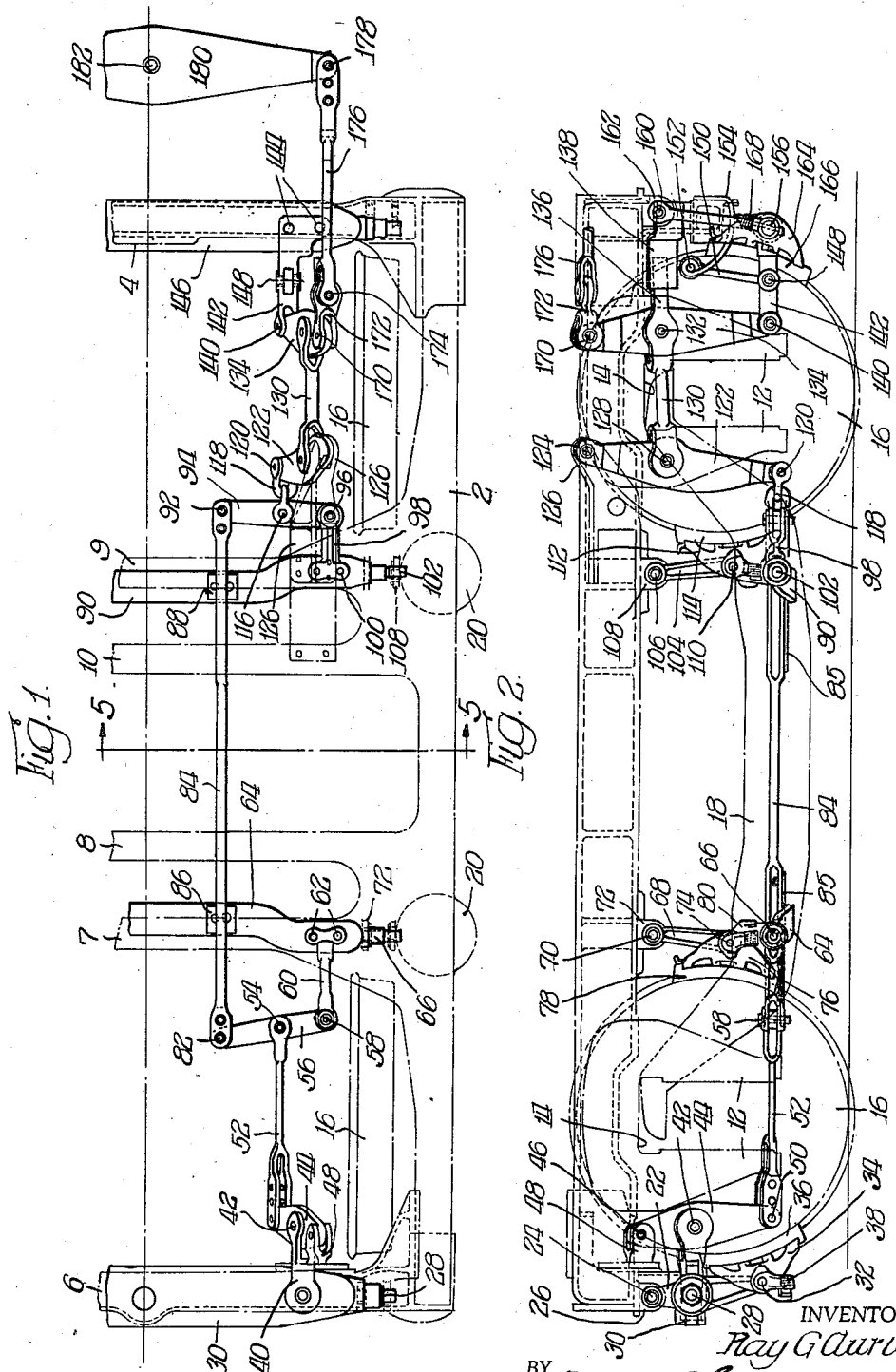
INVENTOR.
Ray G Aurien,
BY May 19, 1942.  R. G. AURIEN  2,283,864
BRAKE ARRANGEMENT
Filed Sept. 20, 1940  2 Sheets-Sheet 2
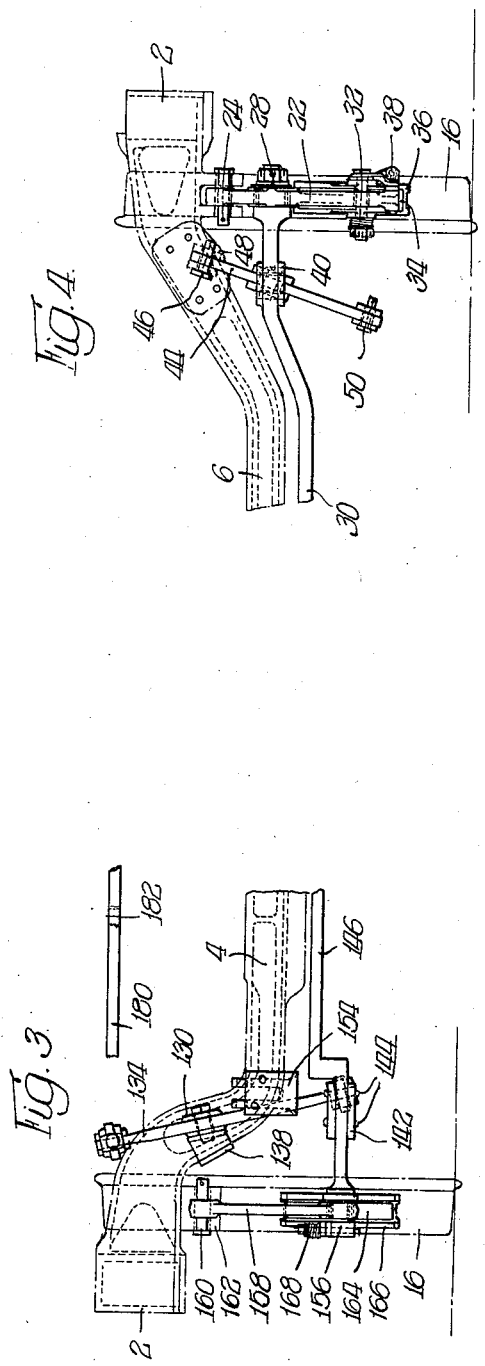
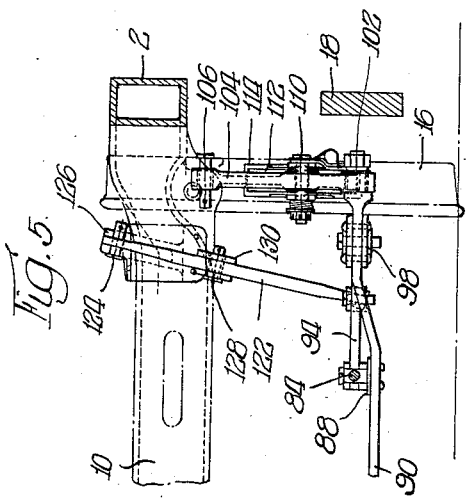
INVENTOR.
Ray G. Aurien,
BY
ATTY.

Patented May 19, 1942

2,283,864

UNITED STATES PATENT OFFICE 2,283,864

BRAKE ARRANGEMENT

Ray G. Aurien, Chicago, Ill., assignor to American Steel Foundries, Chicago, Ill., a corporation of New Jersey Application September 20, 1940, Serial No. 357,579

20 Claims. (Cl. 188—56)

My invention relates to braking means for a railway car truck and more particularly to a type of rigging commonly designated clasp brakes, wherein brake heads and brake shoes are supported at opposite sides of each wheel.

My novel arrangement is particularly suitable for application to a four wheel railway car truck where unusual clearance conditions obtain due to the special relationship between the form of the car body and the truck structure. My novel structure also comprehends an arrangement suitable for application to a car truck supporting a generator and drive means therefor.

My invention contemplates an arrangement wherein a number of the levers associated with the rigging are vertically arranged, and the remainder of them are horizontally arranged, and wherein off-set brake beams are used in order to accommodate pull rod connections between the portions of the rigging at opposite ends of the truck.

My novel arrangement comprehends such a brake rigging as that above described, wherein a plurality of dead levers are utilized at each side of the truck instead of usual single dead end arrangement. This enables me to accomplish in a novel way the clearance conditions desired while also facilitating a convenient arrangement for taking up slack.

Figure 1 is a top plan view of a car truck and brake arrangement embodying my invention, only one side of the truck being shown inasmuch as the arrangement is identical at opposite sides of the truck.

Figure 2 is a side elevation of the truck and brake arrangement shown in Figure 1.

Figure 3 is an end view taken from the right as seen in Figures 1 and 2, and Figure 4 is an end view taken from the left as seen in Figures 1 and 2.

Figure 5 is a sectional view taken substantially in the vertical plane bisecting the truck transversely and as indicated by the line 5—5 of Figure 1.

In each of the figures certain features or arrangements may, for the sake of clarity, be omitted where they are more clearly shown in other figures.

The truck frame is of more or less conventional form comprising the side rail 2, end rails 4 and 6, and spaced transoms 7, 8, 9, and 10, and between the transoms 8 and 10 may be supported the usual bolster (not shown). The side rail 2 has pedestal jaws 12, 12 defining at each end thereof a pedestal opening 14 forming the usual means of connection for journal means (not shown) associated with spaced wheel and axle assemblies 16, 16. Supported on the said journal means at each side of the truck, and extending therebetween is the equalizer means 18 on which may be carried spring groups (not shown), the upper ends of which are afforded seats as at 20, 20 on the side frame 2.

My novel rigging which is of beam type comprises the hanger lever 22 (Figure 2, left) pivotally hung at its upper end as at 24 from the bracket 26 integrally formed with the frame adjacent the juncture of the end rail 6 with the side member 2. Intermediate the ends of the hanger lever 22 is pivotally connected as at 28 the trunnion end of the beam or hanger lever connector 30, and at the lower end of the hanger lever 22 is pivotally supported as at 32 the brake head 34 with the associated brake shoe 36 arranged for engagement with the periphery of the adjacent wheel. The brake head 34 is afforded balancing means 38 of well-known form. The middle portion of the beam 30 is offset downwardly to accommodate the end rail 6 as best seen from the end view of Figure 4. Adjacent the end of the brake beam 30 is secured the jaw fulcrum 40, and in the jaw thereof is pivotally secured as at 42 the dead brake lever 44, the upper end of which is fulcrumed as at 46 from the bracket 48 secured on the end rail 6. The lower end of the dead truck lever 44 has a pivotal and adjustable connection as at 50 to the pull rod 52. The opposite end of said pull rod is pivotally connected as at 54 to the horizontal live auxiliary lever 56 whose outboard end has a pivotal connection as at 58 to the fulcrum 60 secured as at 62 adjacent the end of the offset beam 64. The trunnion end of the beam 64 is pivotally connected as at 66 to the lower end of the hanger lever 68, and the upper end thereof is hung as at 70 from the bracket 72 formed on the under side of the frame adjacent the juncture of the transom 7 with the side member 2. Intermediate the ends of the hanger lever 68 is pivotally supported as at 74 the brake head 76 with the associated brake shoe 78 arranged for engagement with the opposite periphery of the last-mentioned wheel, the position of said head and shoe being made automatically adjustable by the balancing arrangement 80.

The inboard end of the horizontal auxiliary lever 56 has a pivotal and adjustable connection as at 82 to the pull rod 84 which is slidably supported at one end as at 86 on the offset beam 64 and slidably supported adjacent its opposite end as at 88 on the offset beam 90, and the jaw ends of the pull rod are formed with wear plates 85, 85 for bearing upon said offset beams. Each of the intermediate beams 64 and 90 is offset laterally as well as downwardly, and the lateral offset accommodates the normal movement of the auxiliary levers 56 and 94, the inboard ends of which move toward the beams as the brakes are applied. The pull rod 84 extends beyond the beam 90 for pivotal and adjustable connection as at 92 to the horizontally arranged live auxiliary lever 94. The outboard end of the auxiliary lever 94 has a pivotal connection as at 96 to the fulcrum 98 secured as at 100 adjacent the end of the beam 90. The trunnion end of the beam 90 is pivotally connected as at 102 to the lower end of the hanger lever 104 whose upper end is hung as at 106 from the bracket 108 formed on the bottom side of the frame adjacent the juncture of the transom 9 in the side member 2. Intermediate the ends of the hanger lever 104 is pivotally and adjustably supported as at 110 the brake head 112 with the associated shoe 114 arranged for engagement with the periphery of the adjacent wheel.

Intermediate the ends of the live auxiliary lever 94 is pivotally connected as at 116 the clevis means 118, the opposite end of which has a pivotal connection as at 120 to the lower end of the dead truck lever 122, the upper end of said dead truck lever being fulcrumed as at 124 from the bracket 126 secured on the transom 9 adjacent its juncture with the side member 2. Intermediate the ends of the dead truck lever 122 is pivotally connected as at 128 the pull rod 130 and the opposite jaw end of the pull rod 130 is pivotally connected as at 132 to the live truck lever 134, and a portion of the jaw end of the pull rod 130 is extended as at 136 (Figure 2) for guiding engagement with the bracket 138 carried on the adjacent end rail 4 (Figure 3). The lower end of the live truck lever 134 has a pivotal connection as at 140 to the fulcrum 142 which is secured as at 144 on the offset beam 146 adjacent the end thereof. Intermediate the ends of the fulcrum 142 is pivotally connected as at 148 the balance hanger 150, the upper end of which is resiliently supported as at 152 from the strap 154 also carried on the end rail 4. The beam 146 is supported by the pivotal connection of its trunnion end as at 156 to the lower end of the hanger 158 whose upper end is pivotally hung as at 160 from the bracket 162 formed on the frame at the juncture of the end rail 4 with the side member 2. At the pivotal point 156 is also supported the brake head 164 with the associated shoe 166 arranged for engagement with the opposite periphery of the last-mentioned wheel, and the connection of said head at 156 is made adjustable by another well-known type of balancing means 168.

The upper end of the live truck lever 134 has a pivotal connection as at 170 to the clevis means 172, the opposite end of which is pivotally connected as at 174 to the pull rod 176. The opposite end of the pull rod 176 is pivotally and adjustably connected as at 178 to the equalizer 180. The mid-point of said equalizer is arranged as at 182 for connection to operating means (not shown).

In operation, assuming the rigging to be in unapplied position, equalization of the power means moves the equalizer 180 to the right thus rotating live truck lever 134 in a clockwise direction (Figure 2) about the fulcrum intermediate its ends applying the brake shoe at the right of the adjacent wheel while at the same time the dead truck lever 122 is rotated in a counterclockwise direction about the fulcrum 124 at its upper end thus applying the brake shoe at the opposite side of said last-mentioned wheel. At the same time the auxiliary lever 94 is rotated in a clockwise direction (Figure 1) moving to the right the pull rod 84 and rotating the auxiliary lever 56 in a clockwise direction to apply the brake shoes at opposite sides of the wheel at the opposite end of the truck. Release of the power means permits the rigging to return to normal released position by the force of gravity.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, a frame comprising an intermediate transom, supporting wheel and axle assemblies, and brake rigging comprising hanger levers supporting beams intermediate the wheels and at one end of the truck, hangers supporting a beam at the opposite end of the truck, live and dead truck levers associated with the beams at respective ends of the truck, auxiliary levers associated with the intermediate beams, pull rods connecting the auxiliary levers and dead levers at each side of the truck, and operative connections between the live truck levers and adjacent auxiliary levers respectively, the operative connection at each side of the truck comprising a lever fulcrumed at its upper end from said transom and connected intermediate its ends to the adjacent live truck lever, and an operative connection between the fulcrumed lever and the adjacent auxiliary lever.

2. In a clasp brake arrangement for a railway car truck, a frame, spaced supporting wheel and axle assemblies, and beam type rigging comprising live truck levers associated with the beam at one end of the truck, dead truck levers associated with the beam at the opposite end of the truck, auxiliary levers associated with the beams intermediate the wheels, pull rods connecting the auxiliary levers at each side of the truck, pull rods connecting said dead truck levers and the adjacent auxiliary levers, and operative connections between said live truck levers and the adjacent auxiliary levers respectively, each of said operative connections comprising a dead lever fulcrumed at its upper end from said frame, connected at its lower end to the adjacent auxiliary lever and operatively connected intermediate its ends to the adjacent live truck lever.

3. In a brake arrangement for a railway car truck, a frame, supporting wheel and axle assemblies, and beam type rigging comprising hanger levers supporting a beam at one end of the truck and beams intermediate the wheels, hangers supporting a beam at the opposite end of the truck, dead and live truck levers associated with said first and last-mentioned beams respectively, auxiliary levers associated with the beams intermediate the wheels, pull rods connecting the dead levers and the auxiliary levers at each side of the truck, and operative connections between said live truck levers and the adjacent auxiliary levers respectively, each of said operative connections comprising a lever fulcrumed at one end from said frame, connected at its opposite end to the auxiliary lever and intermediate its ends to the live truck lever.

4. In a brake arrangement for a railway car truck, a frame, supporting wheel and axle assemblies, and beam type rigging comprising hanger levers supporting a beam at one end of the truck and beams intermediate the wheels, hangers supporting a beam at the opposite end of the truck, dead and live truck levers associated with said first and last-mentioned beams respectively, auxiliary levers associated with the beams intermediate the wheels, pull rods connecting the dead levers and the auxiliary levers at each side of the truck, and operative connections between said live truck levers and the adjacent auxiliary levers respectively, each of said operative connections comprising a lever fulcrumed from said frame and operatively connected between the adjacent live truck lever and auxiliary lever.

5. In a clasp brake arrangement for a railway car truck, a frame, spaced supporting wheel and axle assemblies, and beam type rigging comprising live truck levers associated with the beam at one end of the truck, dead truck levers associated with the beam at the opposite end of the truck, auxiliary levers associated with the beams intermediate the wheels, pull rods connecting the auxiliary levers at each side of the truck, pull rods connecting said dead truck levers and the adjacent auxiliary levers, and operative connections between said live truck levers and the adjacent auxiliary levers respectively, each of said operative connections comprising a dead truck lever fulcrumed from said frame and operatively connected between the adjacent live truck lever and auxiliary lever.

6. In a brake arrangement for a railway car truck, a frame, supporting wheel and axle assemblies, and brake rigging comprising hanger levers supporting beams intermediate the wheels and at one end of the truck, hangers supporting a beam at the opposite end of the truck, live and dead truck levers associated with the beams at respective ends of the truck, auxiliary levers associated with the intermediate beams, pull rods connecting the auxiliary levers and dead levers at each side of the truck, and operative connections between the live truck levers and auxiliary levers at respective sides of the truck, said intermediate beams being offset laterally to accommodate movement of the adjacent auxiliary levers.

7. In a brake arrangement for a railway car truck, a frame, supporting wheel and axle assemblies and brake rigging comprising hanger levers supporting beams intermediate the wheels and at one end of the truck, hangers supporting a beam at the opposite end of the truck, live and dead truck levers associated with the beams at respective ends of the truck, auxiliary levers associated with the intermediate beams, pull rods connecting the auxiliary levers and dead levers at each side of the truck, and operative connections between the live truck levers and adjacent auxiliary levers respectively, said intermediate beams being offset downwardly to afford slidable support for the pull rods connecting said auxiliary levers.

8. In a brake arrangement for a railway car truck, a frame, supporting wheel and axle assemblies, and beam type rigging comprising hanger levers supporting a beam at one end of the truck and beams intermediate the wheels, hangers supporting a beam at the opposite end of the truck, dead and live truck levers associated with said first and last-mentioned beams respectively, auxiliary levers associated with the beams intermediate the wheels, pull rods connecting the dead levers and auxiliary levers at each side of the truck, and operative connections between said live truck levers and the adjacent auxiliary levers respectively.

9. In a brake arrangement for a railway car truck, a frame, supporting wheel and axle assemblies and brake rigging including hanger levers supporting beams intermediate the wheels and at one end of the truck, hangers supporting a beam at the opposite end of the truck, live and dead truck levers associated with the beams at respective ends of the truck, auxiliary levers associated with the beams intermediate the wheels, pull rods connected between the auxiliary levers at each side of the truck and slidably supported on the intermediate beams, pull rods connecting said dead truck levers with the adjacent auxiliary levers, and an operative connection between said live truck levers and the adjacent auxiliary levers.

10. In a clasp brake arrangement for a railway car truck, a frame, spaced supporting wheel and axle assemblies, and beam type rigging comprising live truck levers associated with the beam at one end of the truck, dead truck levers associated with the beam at the opposite end of the truck, auxiliary levers associated with the beams intermediate the wheels, pull rods connecting the auxiliary levers at each side of the truck, pull rods connecting said dead truck levers and the adjacent auxiliary levers, and operative connections between said live truck levers and the adjacent auxiliary levers respectively, each of said first-mentioned pull rods being slidably supported at spaced points from the beams intermediate the wheels.

11. In a brake arrangement for a railway car truck, a frame, supporting wheel and axle assemblies, and brake rigging comprising hanger levers supporting beams intermediate the wheels and at one end of the truck, hangers supporting a beam at the opposite end of the truck, live and dead truck levers associated with the beams at respective ends of the truck, auxiliary levers associated with the intermediate beams, pull rods connecting the auxiliary levers and dead levers at each side of the truck, and operative connections between the live truck levers and adjacent auxiliary levers respectively.

12. In a brake arrangement for a railway car truck, a frame, supporting wheel and axle assemblies, and brake rigging including hanger levers supporting beams intermediate the wheels and at one end of the truck, hangers supporting a beam at the opposite end of the truck, live and dead truck levers associated with the beams at respective ends of the truck, auxiliary levers associated with the beams intermediate the wheels, pull rods connecting the auxiliary levers at each side of the truck, pull rods connecting said dead truck levers with the adjacent auxiliary levers, and operative connections between said live truck levers and auxiliary levers at each side of the truck.

13. In a brake arrangement for a railway car truck, a frame, supporting wheel and axle assemblies, and brake rigging comprising hanger levers supporting beams intermediate the wheels and at one end of the truck, hangers supporting a beam at the opposite end of the truck, live and dead truck levers associated with the beams at respective ends of the truck, auxiliary levers associated with the intermediate beams, pull rods connecting the auxiliary levers and dead levers at each side of the truck, and operative connections between the live truck levers and auxiliary levers at respective sides of the truck, said intermediate beams being offset laterally to accommodate movement of the adjacent auxiliary levers, each of said pull rods being supported at spaced points from said intermediate beams.

14. In a brake arrangement for a railway car truck, a frame, supporting wheel and axle assemblies, and brake rigging including hanger levers supporting beams intermediate the wheels and at one end of the truck, hangers supporting a beam at the opposite end of the truck, live and dead truck levers associated with the beams at respective ends of the truck, and operative connections between the live and dead levers at each side of the truck including a live lever connected between the dead truck lever at one end of the truck and the live truck lever at the opposite end of the truck.

15. In a brake arrangement for a railway car truck, a frame, supporting wheel and axle assemblies, and brake rigging comprising hanger levers supporting beams intermediate the wheels and at one end of the truck, hangers supporting a beam at the opposite end of the truck, live and dead truck levers associated with the beams at respective ends of the truck, auxiliary levers associated with the intermediate beams, pull rods connecting the auxiliary levers and dead levers at each side of the truck, and operative connections between the live truck levers and adjacent auxiliary levers respectively, each of said pull rods being supported at spaced points intermediate the wheels from adjacent beams.

16. In a brake arrangement for a railway car truck, a frame, supporting wheel and axle assemblies, and brake rigging including hanger levers supporting beams intermediate the wheels and at one end of the truck, hangers supporting a beam at the opposite end of the truck, live and dead truck levers associated with the beams at respective ends of the truck, auxiliary levers associated with the beams intermediate the wheels, pull rods connecting the auxiliary levers at each side of the truck, pull rods connecting said dead truck levers with the adjacent auxiliary levers, and operative connections between said live truck levers and auxiliary levers at each side of the truck, each intermediate beam affording slidable support at spaced points for a plurality of pull rods.

17. In a brake arrangement for a railway car truck, a frame, supporting wheel and axle assemblies, and brake rigging comprising hanger lever supporting beams intermediate the wheels and at one end of the truck, hangers supporting a beam at the opposite end of the truck, live and dead truck levers associated with the beams at respective ends of the truck, auxiliary levers associated with the intermediate beams, pull rods connecting the auxiliary levers and dead levers at each side of the truck, and operative connections between the live truck levers and auxiliary levers at respective sides of the truck, said intermediate beams being offset laterally to accommodate movement of the adjacent auxiliary levers, each beam intermediate the wheels affording slidable support at spaced points for a plurality of pull rods.

18. In a brake arrangement for a railway car truck, a frame, supporting wheel and axle assemblies, and brake rigging comprising hanger levers supporting beams intermediate the wheels and at one end of the truck, hangers supporting a beam at the opposite end of the truck, live and dead truck levers associated with the beams at respective ends of the truck, auxiliary levers associated with the intermediate beams, pull rods connecting the auxiliary levers and dead levers at each side of the truck, and operative connections between the live truck levers and adjacent auxiliary levers respectively, said intermediate beams being offset downwardly to afford slidable support for the pull rods connecting said auxiliary levers, each beam intermediate the wheels affording slidable support at spaced points for certain of said pull rods.

19. In a brake arrangement for a railway car truck, a frame, supporting wheel and axle assemblies, and brake rigging comprising hanger levers supporting beams intermediate the wheels and at one end of the truck, hangers supporting a beam at the opposite end of the truck, live and dead truck levers associated with the beams at respective ends of the truck, and operative connections between the levers at each side of the truck including a pull rod supported at spaced points on said intermediate beams.

20. In a brake arrangement for a railway car truck, a frame, supporting wheel and axle assemblies, and brake rigging comprising hanger levers supporting beams intermediate the wheels and at one end of the truck, hangers supporting a beam at the opposite end of the truck, live and dead truck levers associated with the beams at respective ends of the truck, and operative connections between the levers at each side of the truck including a live lever fulcrumed at one end from an intermediate beam and supported at its opposite end from said last-mentioned beam.

RAY G. AURIEN.